US008340525B2

(12) United States Patent
Bai et al.

(10) Patent No.: US 8,340,525 B2
(45) Date of Patent: Dec. 25, 2012

(54) METHOD AND DEVICE FOR STABILIZING MULTI-CHANNEL OPTICAL SIGNAL WAVELENGTHS

(75) Inventors: Yusheng Bai, Shenzhen (CN); Naisheng Zhang, Shenzhen (CN); Changgui Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 683 days.

(21) Appl. No.: 12/432,217

(22) Filed: Apr. 29, 2009

(65) Prior Publication Data

US 2009/0208215 A1    Aug. 20, 2009

Related U.S. Application Data

(63) Continuation of application No. PCT/CN2007/071126, filed on Nov. 26, 2007.

(30) Foreign Application Priority Data

Dec. 8, 2006    (CN) .......................... 2006 1 0157507

(51) Int. Cl.
*H04J 14/02* (2006.01)
(52) U.S. Cl. .............. 398/95; 398/79; 398/94; 398/196; 398/197; 398/192; 398/195; 398/136; 398/137; 372/32; 372/34; 372/36; 372/38.02
(58) Field of Classification Search .................. 398/195, 398/196, 197, 198, 199, 182, 183, 184, 185, 398/186, 187, 79, 135, 192, 193, 194, 93, 398/94, 95, 136, 137, 158, 159, 162, 163; 372/32, 34, 36, 38.02
See application file for complete search history.

(56) References Cited

U.S. PATENT DOCUMENTS 6,421,151 B1 * 7/2002 Berger et al. .................... 398/79
6,567,198 B1    5/2003 Kang
(Continued)

FOREIGN PATENT DOCUMENTS

CN    1252654 A    5/2000
(Continued)

OTHER PUBLICATIONS

European Patent Office, Extended European Search Report in European Patent Application No. 07817316.8 (Mar. 31, 2010).

(Continued)

*Primary Examiner* — Hanh Phan
(74) *Attorney, Agent, or Firm* — Leydig, Voit & Mayer, Ltd.

(57) ABSTRACT

A method for stabilizing multi-channel optical signal wavelengths includes the following steps. A first detecting signal is stacked on a plurality of driving signals in sequence. A plurality of optical signals generated after being driven by the plurality of driving signals is combined into one optical total signal. A wavelength detection is performed on the optical total signal. A second detecting signal with a frequency band the same as that of the first detecting signal is extracted from the signals obtained after the wavelength detection. The wavelength of the optical signal in the corresponding channel among the multiple channels is controlled according to the second detecting signal. A device for stabilizing multi-channel optical signal wavelengths is also provided. Using the above method or device, the multi-channel optical signal wavelengths can be stabilized, which requires less elements, and has a simple circuit structure, a high integration level, and a low cost.

15 Claims, 3 Drawing Sheets

U.S. PATENT DOCUMENTS

| | | | |
|---|---|---|---|
| 6,735,395 B1 * | 5/2004 | Bai | 398/95 |
| 2003/0231891 A1 * | 12/2003 | Kuzukami et al. | 398/198 |
| 2004/0161249 A1 * | 8/2004 | Suda et al. | 398/198 |
| 2004/0179840 A1 | 9/2004 | Kai et al. | |
| 2005/0286909 A1 * | 12/2005 | Kish et al. | 398/196 |

FOREIGN PATENT DOCUMENTS

| | | |
|---|---|---|
| CN | 1571393 A | 1/2005 |
| CN | 1976262 A | 6/2007 |
| EP | 1 453 236 A2 | 9/2004 |
| GB | 2170370 A | 7/1986 |
| WO | 02/30015 A2 | 4/2002 |

OTHER PUBLICATIONS

European Patent Office, Examination Report in European Patent Application No. 07817316.8 (Jun. 15, 2010).

State Intellectual Property Office of the People's Republic of China, English Translation of Written Opinion of the International Searching Authority in International Patent Application No. PCT/CN2007/071126 (Mar. 13, 2008).

* cited by examiner

METHOD AND DEVICE FOR STABILIZING MULTI-CHANNEL OPTICAL SIGNAL WAVELENGTHS

CROSS-REFERENCE TO RELATED APPLICATIONS

This application is a continuation of International Patent Application No. PCT/CN2007/071126, filed Nov. 26, 2007, which claims priority to Chinese Patent Application No. 200610157507.3, filed Dec. 8, 2006, both of which are hereby incorporated by reference in their entirety.

FIELD OF THE TECHNOLOGY

The present invention relates to an optical communication field, in particular, to a method and a device for stabilizing multi-channel optical signal wavelengths.

BACKGROUND

As the communication services have developed continuously, the demands on the transmission bandwidth of the communication network become increasingly high. One effective solution for improving the transmission bandwidth is to combine optical signals with a plurality of wavelengths into one signal (wavelength division multiplexing, WDM) for being transmitted via optical fibers. However, in a WDM system, especially a dense WDM (DWDM) system (for example, a WDM system with a wavelength interval smaller than or equal to 50 GHz), the wavelength interval between two neighboring channels is rather narrow, so the demands on the accuracy and stability of the wavelength of each optical signal to be multiplexed are quite high.

According to a conventional wavelength locking solution, during the operation process of the system, the wavelength or the accurate wavelength offset of each optical signal is detected by a wavelength detector, and according to a detection result, a feedback is given, so that the wavelength of the signal output from the laser is controlled. In this manner, the wavelength detector for each signal is required to have a high accuracy. Meanwhile, in order to lock the wavelength, the wavelength control at each channel requires using a set of control loops, the structure is rather complicated, and the volume power consumption is fairly large.

In a first solution of the conventional art, as shown in FIG. 1, an optical signal output from each laser is split into two channels of signals by an optical splitter, the signal in one channel is input to a combiner for being combined and then output, and the other signal is input to the wavelength detector for wavelength detection. Each laser requires one optical splitter and one wavelength detector, so that it requires a great number of elements, and has a complicated circuit structure, and a high cost. For the element with a high integration level, sometimes, the splitting and detecting operations of each optical signal even cannot be realized. Each optical signal in each channel is extracted before being combined. However, as for the element with a high integration level, for example, a photonic integrated circuit (PIC), signals from n channels of lasers are output after being combined in the element package, so that the signal in each channel before being combined cannot be extracted, so the wavelength thereof cannot be detected and controlled.

In a second solution of the conventional art, as shown in FIG. 2, the optical signal obtained after being combined firstly passes through one optical splitter, and then a part of the optical signal is directly output, and the optical splitter outputs the other part of the signal to each laser respectively, so as to detect the wavelength and control the wavelength thereof. Thus, each laser requires a wavelength detector, which thus requires a great number of elements, and has a complicated circuit structure, and a high cost. The wavelength detector of each laser is required to have a single channel filtering function.

SUMMARY

The present invention is directed to a method and a device for stabilizing multi-channel optical signal wavelengths.

The present invention provides a device for stabilizing multi-channel optical signal wavelengths, which includes a signal generator, a laser modulation drive and control circuit unit, a wavelength detector, a signal extractor, and a control unit.

The signal generator is adapted to generate a first detecting signal, in which a frequency band of the first detecting signal is different from that of a plurality of driving signals, and the plurality of driving signals is adapted to drive lasers to generate a plurality of optical signals.

The laser modulation drive and control circuit unit is adapted to stack the first detecting signal on the plurality of driving signals in sequence.

The wavelength detector is adapted to detect wavelengths of the plurality of optical signals.

The signal extractor is adapted to extract a second detecting signal from signals output from the wavelength detector, in which a frequency band of the second detecting signal is the same as that of the first detecting signal.

The control unit is adapted to control a sequence for stacking the first detecting signal on the plurality of driving signals and a signal extracting sequence of the signal extractor, and control the wavelengths of the optical signals generated by the lasers according to the received second detecting signal.

The present invention further provides a method for stabilizing multi-channel optical signal wavelengths, which includes the steps as follows.

A first detecting signal is stacked on a plurality of driving signals in sequence, in which a frequency band of the first detecting signal is different from that of the plurality of driving signals. A plurality of optical signals is generated after being driven by the driving signals and then combined into one optical total signal. At least a part of the optical total signal is received for wavelength detection.

A second detecting signal is extracted from the signals obtained after the wavelength detection, in which a frequency band of the second detecting signal is the same as that of the first detecting signal. A wavelength of an optical signal in a corresponding channel among multiple channels is controlled according to the second detecting signal.

It can be known from the technical solution of the present invention that, as compared with the solution of the conventional art, the present invention can detect and control the multi-channel wavelengths by using merely one set of wavelength detecting and controlling device, thereby stabilizing the wavelengths in a multi-channel optical communication system, which requires less elements, and has a simple circuit structure, a high integration level, and a low cost.

DETAILED DESCRIPTION

In a multi-channel optical communication system, a plurality of data is converted into a plurality of driving signals by laser drivers to drive multi-channel emitters. In order to stabilize multi-channel optical signal wavelengths, in the technical solution of the present invention, a detecting signal is stacked on driving signals of the multi-channel emitters in sequence (in a time sharing manner), so that the wavelength signal in each channel carries the detecting signal component in sequence (in the time sharing manner). An optical total signal is obtained after combining the wavelength signal in each channel from the multi-channel emitters, and then, the detecting signal component is extracted from the optical total signal in sequence, and the wavelength of the corresponding channel is controlled according to the extracted detecting signal.

In order to facilitate the understanding of the present invention, the technical solution of the present invention is described below with reference to the accompanying drawings.

Figure 1:
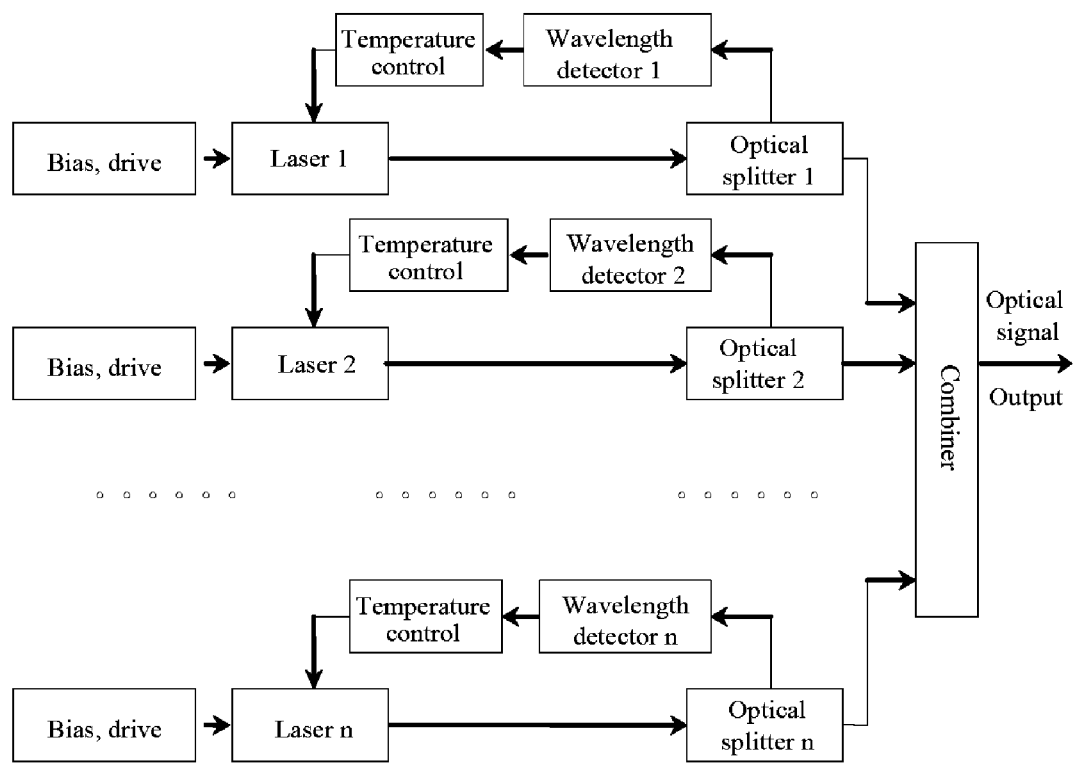
FIG. 1 is a schematic structural view of an optical communication system according to a first conventional solution.
Figure 2:
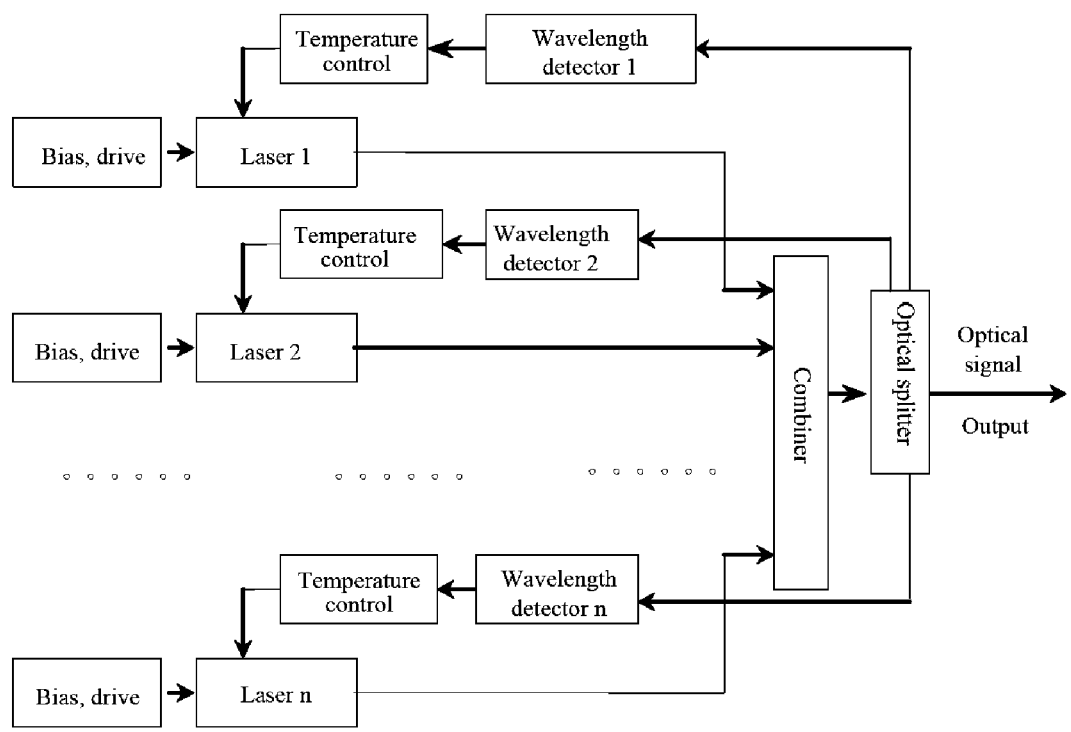
FIG. 2 is a schematic structural view of an optical communication system according to a second conventional solution.
Figure 3:
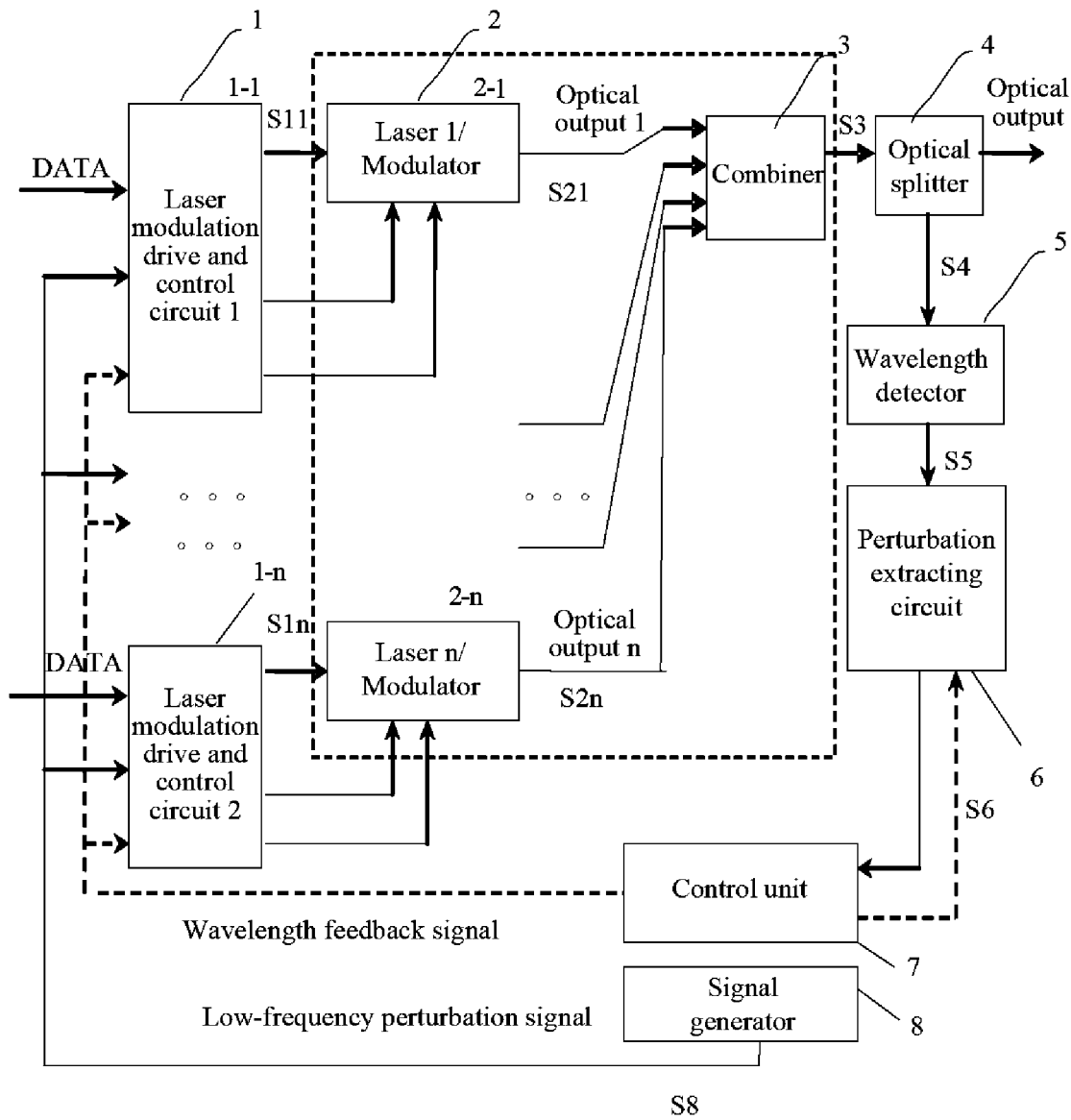
FIG. 3 is a schematic structural view of a device for stabilizing wavelengths according to an embodiment of the present invention.

FIG. 3 is a schematic structural view of a device for stabilizing wavelengths in a multi-channel optical communication system according to an embodiment of the present invention. Referring to FIG. 3, in the optical communication system, a plurality of transmission data (DATA) signals is input to a laser driver including a plurality of laser driving modules (which may be a plurality of independent laser drivers), so that one driving signal is generated for each data signal. Then, the plurality of laser driving signals passes through a multi-channel emitter (which may be a plurality of independent lasers) to generate a plurality of optical signals with different wavelengths. Then, the optical signals with different wavelengths are combined by a combiner into one optical total signal including multi-channel wavelengths for being transmitted via an optical transmission line. Each laser with an external modulation manner, for example, electrical modulation (EA) and Mach-Zehnder (MZ) modulation, may have a corresponding modulator. When each laser works normally, a laser controller may be configured, which controls a bias current, an output optical power, and controlling parameters for electric-to-optical conversion of the laser. In an embodiment of the present invention, the laser driver and the laser controller are integrated together. Each transmission data (DATA) is an electrical signal required to be converted into an optical signal. The electric signal is driven and amplified by the driver, and then is input to the laser/modulator, so that the electric-to-optical conversion is performed.

Referring to FIG. 3, the device for stabilizing wavelengths further includes a signal generator, an optical splitter, a wavelength detector, a signal extractor, and a control unit.

The signal generator is connected to the plurality of driving modules of the laser driver, and is adapted to generate a first detecting signal, which is stacked on the plurality of driving signals in sequence. In this manner, the wavelength of the optical signal, being output after the electric-to-optical conversion is performed on the first detecting signal by the laser/modulator, is the same as the channel wavelength of the transmission data signal, in which a frequency band of the first detecting signal is different from that of the plurality of driving signals. With respect to the transmission data (DATA) signals or the driving signals, the first detecting signal may be a perturbation signal, that is, a frequency of the first detecting signal is generally lower than that of the transmission data (DATA) signal, for example, if the transmission data (DATA) signal is a signal larger than 30 Mbps, the first detecting signal may be a signal of 1-10 KHz. An amplitude of the first detecting signal is lower than that of the transmission data signal, so as to ensure that the modulated first detecting signal component takes approximately 1% to 5% of the whole power of the signal, so that the signal is called a low-frequency perturbation signal.

The optical splitter is adapted to split at least a part of optical signal from the combined optical total signal.

The wavelength detector is adapted to detect a wavelength of the at least a part of optical signal split by the optical splitter. The wavelength detector inputs an optical signal having a plurality of wavelengths, and outputs a voltage signal, in which the output voltage signal carries the first detecting signal component (for example, low-frequency perturbation signal component). In this embodiment, the wavelength detector is equivalent to a spindle-shaped filter, and satisfies the condition of having monotonous response characteristics in each single wavelength interval. Thus, as for the optical signal of each wavelength, the output voltage is a monotone function of the wavelength within the corresponding wavelength interval.

The signal extractor is connected to the wavelength detector, and is adapted to receive the electric signals output from the wavelength detector, and extract a second detecting signal with a frequency band the same as that of the first detecting signal from the signals output from the wavelength detector. The signal extractor may be a band-pass filter, and a central frequency of the pass band filter is just the frequency of the perturbation signal. The signal extractor can extract and amplify the perturbation signal, and the magnitude of the signal output from the signal extractor varies with the wavelength of the laser, so as to detect the change of the wavelength.

The control unit is adapted to control a stacking sequence of the signal generator and a signal extracting sequence of the signal extractor, and control the wavelength of the optical signal of the multi-channel emitters according to the received second detecting signal.

In this embodiment, according to the sequentially extracted second detecting signal, the wavelength of the optical signal in the corresponding channel of the multi-channel emitters is controlled based on the same sequence for stacking the first detecting signal. For example, according to the same time interval for stacking the first detecting signal on the corresponding channel of the multi-channel emitters, the second detecting signal with a frequency band the same as that of the first detecting signal is extracted from the wavelength detection result received by the wavelength detector.

In this embodiment, two manners for controlling the wavelength of the optical signal of the emitters can be adopted. In a first manner, a changing direction of the wavelength is determined according to the second detecting signal, so as to determine a compensation direction of the wavelength. The laser controller may perform the compensation according to preset parameters, and particularly, the temperature of the chip of the laser (for determining the wavelength of the output optical signal) is controlled according to a preset temperature compensation parameter, thereby stabilizing the wavelengths. When such controlling manner is adopted, it generally requires generating the first detecting signal periodically, and controlling the change of the wavelength through the circulating feedback control in a closed loop manner until the wavelength is stabilized. In the other manner, an offset absolute value and an offset direction of the change of the wavelength are determined according to the second detecting signal. When such controlling manner is adopted, the circulating feedback control is not required during controlling. Instead, the compensation direction of the wavelength is determined according to the offset direction of the change of the wavelength, and the compensation amount of the wavelength is determined according to the offset absolute value of the change of the wavelength. The wavelength of the optical signal in the corresponding channel of the emitters is controlled according to the temperature compensation parameter determined according to the compensation amount of the wavelength. Of course, when such controlling manner is adopted, the change of the wavelength may also be controlled through the circulating feedback control mode in the closed loop manner until the wavelength is stabilized.

In addition, the laser controller in this embodiment is required to have the function of processing the DATA signal to cater to the requirements about the amplitude, bias, and cross point of the laser/modulator, and to provide a direct current (DC) working point of the laser/modulator, so as to determine the magnitude of the output optical power.

In the multi-channel optical communication system, a plurality of data is converted into a plurality of driving signals by the laser drivers, and the wavelengths are stabilized through the following manner in the present invention.

A. The first detecting signal with a frequency band different from that of the plurality of driving signals is generated, and the generated first detecting signal is stacked on the plurality of driving signals in sequence, so as to drive multi-channel emitters to generate a plurality of optical signals, and the plurality of optical signals is combined into one optical total signal by a combiner.

B. At least a part of the optical total signal is received and input to a wavelength detector for wavelength detection.

C. The second detecting signal with a frequency band the same as that of the first detecting signal is extracted in sequence from the wavelength detection result received by the wavelength detector.

D. The wavelength of the optical signal in the corresponding channel of the multi-channel emitters is controlled according to the sequentially extracted second detecting signal.

FIG. 3 is a schematic view of a device for stabilizing multi-channel wavelengths according to an embodiment of the present invention. In the device, n data (DATA) are converted into n driving signals through n modulation drive and control circuits (1), and meanwhile, a perturbation signal generated by the signal generator (8) is stacked on the n driving signals in a time sharing manner. The n driving signals stacked with the perturbation signal in the time sharing manner respectively drive n lasers/modulators (2) to output n optical signals with different wavelengths, and then, the n optical signals with different wavelengths are combined by the combiner (3) into one optical total signal having a plurality of wavelengths. The optical total signal is split by the optical splitter (4) at an output end, so as to obtain a part of the optical total signal, and then, the part of the optical total signal is input to the wavelength detector (5), so that the optical signal is converted into an electric signal. The control unit (7) controls a perturbation extracting circuit (6) to extract the perturbation component from the electric signal output from the wavelength detector (5), and controls the laser modulation drive and control circuit according to the extracting result, and the control circuit controls the compensation parameter of the laser, so as to stabilize the wavelengths thereof. It is assumed that a data transmission speed is 30 Mbps, and a detailed flow for stabilizing the wavelengths includes the steps as follows.

In Step S401, the signal generator generates the first detecting signal with the frequency band different from that of the plurality of driving signals.

The frequency band of the generated first detecting signal is different from that of the plurality of driving signals, which aims at differentiating the first detecting signal from the data transmission signals or the driving signals, so that the subsequent extracting step can be performed conveniently. For example, the perturbation signal S8 is adopted in this embodiment, the frequency of the perturbation signal is 1-10 KHz, and the power of the perturbation signal takes 1% to 5% of the whole power of the signal.

In Step S402, the perturbation signal S8 is stacked on the n laser modulation drive and control circuits in sequence (or in the time sharing manner).

For example, one cycle time T is divided into time slots $\Delta T$ with equal intervals, in which $T = n \times \Delta T$. At a time point of $i \times \Delta T$, the control unit (7) controls the laser modulation drive and control circuit (1-$i$) to stack the perturbation signal on an ith driving signal, and at this time, the ith driving signal is $S1i$ stacked with the perturbation signal S8.

In Step S403, the n driving signals ($S11, S12 \ldots S1i \ldots S1n$) respectively drive n lasers/modulators to output n optical signals ($S21, S22 \ldots S2i \ldots S2n$).

At the time point of $i \times \Delta T$, the perturbation signal S8 is stacked on the driving signal $S1i$, so that the wavelength signal $S2i$ output from the ith laser/modulator carries the perturbation component.

In Step S404, the plurality of optical signals ($S21, S22 \ldots S2i \ldots S2n$) are combined by the combiner (3) into one optical total signal S3 including the plurality of optical signals.

The combined signal S3 carries the perturbation component of S8 at each time interval $\Delta T$, and the perturbation component in the ith time interval $\Delta T$ represents the perturbation component of the ith optical signal.

In Step S405, the optical splitter (4) splits at least a part of optical signal from the output optical total signal S3 to obtain an optical signal S4, and the optical signal S4 includes all the wavelength components of the optical total signal S3 and also carries the perturbation component.

In Step S406, the wavelength detector (5) detects the wavelength of the optical signal S4, and outputs a wavelength-detection electric signal S5.

The wavelength detector is equivalent to a spindle-shaped filter, and satisfies the condition of having monotonous response characteristics in each single wavelength interval. As for the optical signal of each wavelength, the output voltage is a monotone function of the wavelength within the corresponding wavelength interval. In this manner, in each time interval $\Delta T$, the perturbation component of S8 is monotonously changed with the changing of the corresponding wavelength.

In Step S407, a perturbation component S8' with a frequency band the same as that of the perturbation signal S8 is sequentially extracted from the wavelength-detection electric signal S5 and is amplified.

A perturbation extract circuit (6) works under the control of the control unit, and extracts signals by adopting a frequency the same as that of the perturbation signal, that is, after extracting the first perturbation signal S8', the perturbation extract circuit (6) respectively extracts subsequent perturbation signals at the time interval $\Delta T$. In addition, when the signals are extracted, a band-pass filter with a perturbation frequency is adopted to restrain the out-of-band noises, thereby improving the sensitivity.

In Step S408, the wavelength of the optical signal in the corresponding channel of the multi-channel emitters is respectively controlled according to each perturbation signal S8' extracted sequentially.

For example, the output wavelength of the ith laser/modulator corresponds to the ith perturbation signal S8', and the amplitude of S8' is changed corresponding to the change of the wavelength of the optical signal, so that the wavelength of the ith laser/modulator is controlled according to the change of the wavelength.

Two control manners may be adopted.

1. State Control Manner (1) The compensation direction of the wavelength of the laser/modulator is determined according to a changing direction of the wavelength of the optical signal.

For example, the change of the amplitude V of the ith perturbation signal S8' indicates that the wavelength is increased, so the control unit (7) instructs the ith laser modulation drive and control circuit (1-$i$) to decrease the wavelength.

(2) The compensation is performed according to a preset temperature compensation parameter, in which the preset temperature compensation amount is set according to the requirements on the precision and the stabilizing rate.

(3) Step A is repeated till the wavelengths of the optical signals in all the channels are stabilized. In this embodiment, the wavelengths are stabilized and controlled in real time through the circulating feedback control with T as a cycle.

The amplitude V of the extracted perturbation signal S8' is processed through the following steps. Initially, the laser is set to output a nominal wavelength through debugging, and the corresponding result of the signal extractor (6) is an initial value V0. During working, the control unit (7) compares the amplitude V of the result S8' of the signal extractor (6) with the initial value V0 in real time, outputs a controlling direction of the wavelength, and forms a negative feedback loop, thereby stabilizing the wavelengths.

2. Accurate Control Manner (1) The compensation value and the compensation direction of the wavelength of the laser/modulator are determined according to the changing absolute value and the changing direction of the wavelength of the optical signal.

For example, the change of the amplitude V of the ith perturbation signal S8' indicates that the wavelength is increased and further indicates an amplitude increment, so the control unit (7) instructs the ith laser modulation drive and control circuit (1-$i$) to decrease the wavelength, and determines the compensation value of the wavelength according to the amplitude increment.

(2) The compensation is performed according to the temperature compensation parameter of the ith laser/modulator determined according to the compensation value of the wavelength.

When this manner is adopted, since it is an accurate compensation, Step A is not required to be repeated, but the wavelength of the optical signal output from the laser is quite sensitive to the temperature, so that the wavelength is controlled through the circulating feedback control, thereby stabilizing the wavelengths in real time.

The amplitude V of the extracted perturbation signal S8' is processed through the following steps. Initially, the laser is set to output a nominal wavelength through debugging, and the corresponding result of the signal extractor (6) is an initial value V0. During working, the control unit (7) compares the amplitude V of the result S8' of the signal extractor (6) with the initial value V0 in real time, outputs the controlling direction and the compensation amount of the wavelength, and controls the temperature compensation parameter according to the compensation amount of the wavelength, thereby stabilizing the wavelengths.

By comparing the state control manner with the accurate control manner, it is found that the state control manner has a simple controlling method and a simple circuit structure, thereby effectively lowering the cost.

Through the technical solution of the present invention, the following beneficial efficacies are achieved.

1. A plurality of lasers adopts merely one optical splitter and one wavelength detector and circuits thereof for detecting the wavelength of the signal output from each laser, thereby further stabilizing and controlling the wavelengths, which requires less elements, and has a simple circuit structure, a small volume, and a low cost.

2. As for the element with a high integration level, for example, a PIC, the signals from n lasers are output after being combined in the element package, so that each signal before being combined cannot be extracted. However, under such a situation, the wavelengths can still be well controlled in the present invention.

It will be apparent to those skilled in the art that various modifications and variations can be made to the present invention without departing from the scope or spirit of the invention. In view of the foregoing, it is intended that the present invention cover modifications and variations of this invention provided that they fall within the scope of the following claims and their equivalents.

What is claimed is:

1. A device for stabilizing multi-channel optical signal wavelengths, comprising:
   a signal generator, configured to generate a first detecting signal, wherein a frequency band of the first detecting signal is different from that of a plurality of driving signals, and the plurality of driving signals are configured to drive lasers to generate a plurality of optical signals;
   a laser modulation drive and control circuit unit, configured to stack the first detecting signal on the plurality of driving signals in sequence;
   a wavelength detector, configured to detect wavelengths of the plurality of optical signals to output a voltage signal in which the output voltage signal carries component of the first detecting signal, wherein as for the optical signal of each wavelength the output voltage is a monotone function of the wavelength within corresponding wavelength interval;
   a signal extractor, configured to extract a second detecting signal from the signal output from the wavelength detector in sequence, wherein a frequency band of the second detecting signal is the same as that of the first detecting signal; and
   a control unit, configured to control a sequence for stacking the first detecting signal on the plurality of driving signals and a signal extracting sequence of the signal extractor, and control the wavelengths of the optical signals generated by the lasers according to the received second detecting signal.

2. The device according to claim 1, further comprising:
   a combiner, configured to combine the plurality of optical signals generated by the lasers into one optical total signal; and an optical splitter, configured to split at least one part of optical signal from the received optical total signal, and input the at least one part of optical signal to the wavelength detector.

3. The device according to claim 1, wherein the first detecting signal is a low-frequency perturbation signal, a frequency band of the low-frequency perturbation signal is lower than that of any driving signal among the plurality of driving signals, and a power of the low-frequency perturbation signal is lower than that of any driving signal among the plurality of driving signals.

4. The device according to claim 1, wherein the signal extractor comprises a band-pass filter, configured to extract the second detecting signal.

5. The device according to claim 1, wherein the wavelength detector is a detector which feedbacks optical wavelength change information.

6. The device according to claim 5, wherein the wavelength detector is a spindle-shaped filter.

7. A method for stabilizing multi-channel optical signal wavelengths, comprising:
stacking a first detecting signal on a plurality of driving signals in sequence, wherein a frequency band of the first detecting signal is different from that of the plurality of driving signals;
combining a plurality of optical signals generated after being driven by the plurality of driving signals into one optical total signal;
receiving at least one part of the optical total signal, and performing a wavelength detection on the received at least one part of the optical total signal to output a voltage signal in which the output voltage signal carries component of the first detecting signal, wherein as for the optical signal of each wavelength, the output voltage is a monotone function of the wavelength within corresponding wavelength interval;
extracting a second detecting signal from the signals obtained after the wavelength detection in sequence, wherein a frequency band of the second detecting signal is the same as that of the first detecting signal; and
controlling a wavelength of an optical signal in a corresponding channel among the multiple channels according to the second detecting signal.

8. The method according to claim 7, wherein the first detecting signal is a low-frequency perturbation signal, a frequency band of the low-frequency perturbation signal is lower than that of any driving signal among the plurality of driving signals, and a power of the low-frequency perturbation signal is lower than that of any driving signal among the plurality of driving signals.

9. The method according to claim 7, wherein the extracting the second detecting signal with the same frequency band as that of the first detecting signal from the signal obtained after the wavelength detection further comprises:
extracting the second detecting signal with the same frequency band as that of the first detecting signal from the signal obtained after the wavelength detection according to a time interval the same as that for stacking the first detecting signal on the corresponding channel.

10. The method according to claim 7, wherein the controlling the wavelength of the optical signal in the corresponding channel among the multiple channels according to the second detecting signal further comprises:
controlling the wavelength of the optical signal in the corresponding channel based on a sequence the same as that for stacking the first detecting signal according to the second detecting signal.

11. The method according to claim 10, wherein the controlling the wavelength of the optical signal in the corresponding channel according to the second detecting signal further comprises:
determining a compensation direction of the wavelength according to a changing direction of the second detecting signal, and performing compensation according to a preset compensation parameter until the wavelength of each channel optical signal is stabilized.

12. The method according to claim 10, wherein the controlling the wavelength of the optical signal in the corresponding channel according to the second detecting signal further comprises:
determining a compensation direction and a compensation amount of the wavelength according to a changing direction and a changing amplitude of the second detecting signal, and controlling the wavelength of the optical signal in the corresponding channel according to a temperature compensation parameter determined according to the compensation amount of the wavelength.

13. The method according to claim 7, wherein the controlling the wavelength of the optical signal in the corresponding channel according to the second detecting signal further comprises:
determining a compensation direction of the wavelength according to a changing direction of the second detecting signal, and performing compensation according to a preset compensation parameter until the wavelength of each channel optical signal is stabilized.

14. The method according to claim 7, wherein the controlling the wavelength of the optical signal in the corresponding channel according to the second detecting signal further comprises:
determining a compensation direction and a compensation amount of the wavelength according to a changing direction and a changing amplitude of the second detecting signal, and controlling the wavelength of the optical signal in the corresponding channel according to a temperature compensation parameter determined according to the compensation amount of the wavelength.

15. The method according to claim 7, wherein
the first detecting signal is stacked on the plurality of driving signals according to an equal time interval $\Delta T$;
the second detecting signal is extracted from the signal obtained after the wavelength detection according to the equal time interval $\Delta T$, and the frequency band of the second detecting signal is the same as that of the first detecting signal; and
the wavelength of the optical signal in the corresponding channel of multi-channel emitters is controlled in sequence based on the equal time interval $\Delta T$ according to the second detecting signal.

* * * * *